(12) United States Patent
Espinosa et al.

(10) Patent No.: US 12,715,607 B2
(45) Date of Patent: Aug. 25, 2026

(54) EMERGENCY TRANSMITTER DEVICE

(71) Applicant: Goodrich Corporation, Charlotte, NC (US)

(72) Inventors: Katrina Lizada Espinosa, Sto. Tomas (PH); Rejeano Carmelo Loreto Vargas, Calamba (PH); Kevin Rio Asi Gonzales, Padre Garcia (PH); Renz Jeremiah Apritado Mercado, San Jose (PH)

(73) Assignee: GOODRICH CORPORATION, Charlotte, NC (US)

( * ) Notice: Subject to any disclaimer, the term of this patent is extended or adjusted under 35 U.S.C. 154(b) by 92 days.

(21) Appl. No.: 18/958,704

(22) Filed: Nov. 25, 2024

(65) Prior Publication Data

US 2026/0152289 A1 Jun. 4, 2026

(30) Foreign Application Priority Data

Jan. 26, 2024 (EP) .................................... 24154286

(51) Int. Cl.
*B64D 45/00* (2006.01)
*H01Q 1/22* (2006.01)
(Continued)

(52) U.S. Cl.
CPC ........... *B64D 45/00* (2013.01); *H01Q 1/2225* (2013.01); *H04B 1/034* (2013.01); *B64D 2045/0065* (2013.01); *H01Q 1/281* (2013.01)

(58) Field of Classification Search
CPC ............ B64D 45/00; B64D 2045/0065; B64D 25/20; H01Q 1/2225; H01Q 1/281;
(Continued)

(56) References Cited

U.S. PATENT DOCUMENTS 6,275,164 B1 8/2001 MacConnell et al.
9,540,112 B2 1/2017 Cavan et al.
(Continued)

FOREIGN PATENT DOCUMENTS

| CN | 110588969 B | 5/2023 |
|---|---|---|
| TR | 201613540 A2 | 4/2017 |
| WO | 2016203322 A2 | 12/2016 |

OTHER PUBLICATIONS

Abstract of CN110588969 (B); Published: May 19, 2023, 1 page.
European Search Report for Application No. 24154286.9, mailed Jun. 21, 2024, 12 pages.

*Primary Examiner* — Andrew Sasinowski
(74) *Attorney, Agent, or Firm* — CANTOR COLBURN LLP

(57) ABSTRACT

A deployable emergency transmitter device is configured to be launched from an aircraft in an initial passive flight state. The device includes an internal chassis, and an inertial mass member, rotatable relative to the internal chassis, for stabilising flight during the initial passive flight state. The device also includes a powered drive system, mounted to the internal chassis and configured for providing lift while the deployable emergency transmitter device is in an active flight state and a radio transmitter configured for transmitting an emergency signal after being launched from the aircraft. The device is configured to transition from the initial passive flight state to the active flight state, after being launched from the aircraft.

15 Claims, 6 Drawing Sheets

(51) Int. Cl.
*H01Q 1/28* (2006.01)
*H04B 1/034* (2006.01)

(58) Field of Classification Search
CPC ........ H04B 1/034; B64U 70/20; B64U 82/82; B64U 10/14; B64U 50/19; B64U 70/70; B64C 17/06
See application file for complete search history.

(56) References Cited

U.S. PATENT DOCUMENTS

| | | | | |
|---|---|---|---|---|
| 9,975,640 | B1 * | 5/2018 | Wang | G01S 1/725 |
| 10,227,136 | B1 * | 3/2019 | Waggener, Jr. | B64D 25/20 |
| 10,988,251 | B2 | 4/2021 | Georges | |
| 11,312,489 | B2 | 4/2022 | Skladman et al. | |
| 11,851,161 | B1 | 12/2023 | Stroud | |
| 2017/0061748 | A1 | 3/2017 | Graham et al. | |
| 2018/0232970 | A1 * | 8/2018 | Satyanarayana | B64D 45/00 |
| 2019/0315462 | A1 * | 10/2019 | Skladman | B64D 45/00 |
| 2022/0144429 | A1 * | 5/2022 | Warner, IV | B64U 20/87 |

* cited by examiner

EMERGENCY TRANSMITTER DEVICE

CROSS-REFERENCE TO RELATED APPLICATIONS

This application claims the benefit of European Patent Application No. 24154286.9 filed Jan. 26, 2024, the disclosure of which is incorporated herein by reference in its entirety.

FIELD

The present disclosure is in the field of deployable emergency transmitter devices.

BACKGROUND

An emergency locating beacon of an aircraft is a radio beacon, a mobile radio transmitter powered by batteries, used to find an aircraft in need of immediate assistance. An emergency, such as an aircraft disaster, will cause activation of the transmitter to emit a radio signal. This signal is utilised by search and rescue teams to locate the aircraft and provide aid as soon as possible. Rapid response in the event of an aircraft disaster is essential to ensure that as many survivors as possible can be saved.

While emergency locating beacons are used to locate lost aircraft, there are times when the aircraft may land in regions inaccessible by radio signals or frequencies, or potentially underwater.

Deployable emergency transmitted devices are known that can be deployed from an aircraft in an emergency situation. However, these can suffer from poor aerodynamic performance, e.g. due to the turbulent air around an aircraft. The present disclosure aims to provide an improved deployable emergency transmitter device.

SUMMARY OF THE INVENTION

From a first aspect, the present disclosure provides a deployable emergency transmitter device configured to be launched from an aircraft in an initial passive flight state. The device includes: an internal chassis; an inertial mass member, rotatable relative to the internal chassis, for stabilising flight during the initial passive flight state; a powered drive system, mounted to the internal chassis and configured for providing lift while the deployable emergency transmitter device is in an active flight state; and a radio transmitter configured for transmitting an emergency signal. The deployable emergency transmitter device is configured to transition from the initial passive flight state to the active flight state after being launched from the aircraft.

The deployable emergency transmitter device may be configured for use with a launch system for launching the deployable emergency transmitter device from the aircraft.

Thus, from a second aspect, the present disclosure provides an emergency transmitter system that includes: a deployable emergency transmitter device as disclosed herein, and a launch system for launching the deployable emergency transmitter device from the aircraft. The launch system is configured to: initiate inertial stabilisation of the deployable emergency transmitter device by setting the rotatable inertial mass member rotating relative to the internal chassis; and launch the deployable emergency transmitter device from the aircraft.

This aspect also extends to an aircraft comprising such an emergency transmitter system.

After being deployed, the deployable emergency transmitter device will transition from the passive flight state to the active flight state. Therefore, from a third aspect, the present disclosure provides a method for operating a deployable emergency transmitter device as disclosed. The method includes: launching the deployable emergency transmitter device from an aircraft in an initial passive flight state wherein the inertial mass member is rotating relative to the internal chassis; activating the radio transmitter to transmit an emergency signal; and transitioning the deployable emergency transmitter device from the initial passive flight state to the active flight state.

In some examples, the inertially-stabilised initial passive flight state may allow the device to be thrown clear of the aircraft before the device later transitions to an active (i.e. powered) flight state, resulting in the device being unlikely to be damaged, or unable to fly, due to impact with the aircraft or as a result of turbulent airflow around the aircraft.

The emergency transmitter device may be configured to be launched manually, e.g. by a pilot or by other crew member. Alternatively or additionally, the emergency transmitter device may be arranged to be launched automatically, e.g. in response to detecting a condition or conditions being met that are indicative of an emergency, such as a sudden abnormal altitude change, a collision, or the loss of power to the aircraft.

The drive system may be electric, e.g. comprising one or more electric motors. The emergency transmitter device may comprise a battery. In some examples, it may comprise one or more solar cells, e.g. to provide power to an internal battery. This may help prolong the operational lifetime of the emergency transmitter device once launched. The emergency transmitter device may comprise a battery system, e.g. to enable continued operation of the emergency transmitter device in low sunlight conditions, such as during intense cloud cover or during the night.

The device may typically be launched into high relative wind. The device may wait until its flight is stabilised before transitioning from the initial passive flight state to the active flight state. The stabilisation may result from the rotation of the rotatable inertial mass alone, or it may result from the motion of the rotatable inertial mass in combination with one or more other stabilisation systems.

The device may be configured to determine when the device has reached a stable flight condition after being launched from the aircraft, and may be configured to transition from the initial passive flight state to the active flight state in response thereto. The emergency transmitter device may comprise one or more sensors to detect when the emergency transmitter device has reached a stable flight condition. Having sensors configured to sense stable flight conditions may advantageously allow for the emergency transmitter device to transition to the active flight state only once safe or optimal conditions have been met, and ensure that the device (e.g. drive system) is not damaged by turbulence or excessively high forces. The one or more sensors may comprise an inertial measurement unit (IMU). The one or more sensors may comprise one or more of: an accelerometer; a gyroscope; a magnetometer; a tilt sensor; a wind speed sensor; a GPS location system; a pressure sensor; or a camera.

The emergency transmitter device may comprise a control system, which may comprise control electronics and/or a processor and memory storing software for execution by the processor, for performing any of the control operations disclosed herein. The control system may be configured to determine when one or more conditions are met for transitioning to the active flight state. The conditions may include any one or more of: a speed condition, a location condition, an altitude condition, an orientation condition, an inclination condition, a pitch condition, an acceleration condition, a time condition, or a measure of stability (e.g. based on a derivative of any of these conditions over time). It may do so by processing data received from the one or more sensors. The device may be configured to activate the drive system in response to this determination.

In some examples, the emergency transmitter device may be equipped with an internal timer for timing a predetermined period from when the device is launched. A device equipped with such a timer may use this, optionally in conjunction with one or more sensors, for determining when to transition to the active flight state.

The device may use one or more of the same sensors, and/or one or more additional sensors, to control the device during the active flight state. In particular, it may comprise a GPS receiver and an inertial measurement unit, and be configured to use these for controlling the powered drive system during the active flight state—e.g. to follow a flight path and/or maintain a desired direction and speed. The device may use these sensors to follow the aircraft when in the active flight state. It may use them to travel to a nearest emergency response unit.

After the emergency transmitter device transitions to the active flight state, it may be further configured to monitor the aircraft using one or more on-board sensors, such as a camera (e.g. a thermal camera, for tracking a trajectory of the aircraft), and/or using a radio link with the aircraft.

Transitioning to the active flight state may comprise activating an on-board camera system. The on-board camera system may be fitted with a gimbal system for optical tracking of the aircraft when the emergency transmitter device is in the active flight state. In some examples, the camera system may be equipped with night vision capabilities—these may provide accurate surveillance of the aircraft if the emergency occurs during low light conditions. The camera system may be equipped with a thermal imaging sensor, which may advantageously allow the emergency transmitter drone to identify survivors of the aircraft emergency as it monitors the aircraft. The camera system may be preprogramed with software enabling the camera system to autonomously optically track the motion of the aircraft.

The emergency transmitter device may comprise a radio transceiver and be configured to receive and respond to remote commands (e.g. from a human operator) after the emergency transmitter device has been launched. In some examples, a human operator may take manual control of aspects of the device, such as the drive system, or the camera system.

During the active flight state, the drive system may directly generate all of the lift for the device in the active flight state (i.e. without using an aerofoil wing). It may be configured to generate thrust predominantly in a downward direction. The drive system may be configured to enable the device to hover and/or move horizontally.

The drive system for the active flight state may comprise one or more rotor blades. There may be four rotor blades which may be arranged to form a square configuration. In some examples the drive system may provide a quadcopter for optimal stability while in the active flight state.

Alternatively, the drive system may comprise a microturbine jet engine, a turbofan engine, or any other suitable internal combustion-based engines. In such examples, the internal chassis (e.g. fuselage) of the emergency transmitter device contains a fuel tank to supply the engine. In examples, the drive system may be configured with vectoring capability, which may advantageously provide the emergency transmitter device with greater maneuverability while in the active flight state.

In order to make sure the transmitter device is launched safely away from the aircraft in distress, the emergency transmitter device may be launched at a predetermined upward angle relative to the aircraft (e.g. to a horizontal plane when in level flight) or to the ground. The device may be shaped so as to generate lift when travelling through air at an inclined angle—e.g. according to a flying-disc principle. The predetermined angle may be greater than 0 degrees. The predetermined angle may be less than 180 degrees. Preferably, the predetermined angle may be above 15 and/or below 60 degrees, for example 45 degrees; this may help to achieve good clearance from the aircraft and/or sufficient lift for sustaining passive flight until the transition to active flight state.

The rotatable inertial mass member may be or comprise an exterior chassis of the emergency transmitter device. The mass member may be configured to rotate about the internal chassis on bearings.

The device (e.g. the exterior chassis) may be rotationally uniform in shape. It may have an outer surface that is a surface of revolution about a central axis of the device. The rotatable inertial mass member may be arranged for rotation about the or a central axis of the device. The device may be disc shape, and may have a domed upper surface and/or a domed lower surface. It may be oblate spheroidal in shape. It may have a diameter (e.g. across an equator) that it larger than a height (e.g. along a central axis) of the device, e.g. by two, three or more times. This may provide good aerodynamic properties, e.g. minimising drag for efficient gliding, even in high wind speed, although any other suitable shape or profile of the exterior chassis may be used (e.g. aerofoil).

An outer surface of the device may comprise one or two apertures (e.g. an upper aperture and a lower aperture) for allowing the passage of air through the device during active flight. The device may comprise a respective door for each aperture, and may be configured to open each door when transitioning to the active flight state.

The emergency transmitter device may be deployed automatically in response to the aircraft falling below a predetermined altitude (e.g. outside of expected operation). In some embodiments, the predetermined altitude may be 1500 ft. It may be less than 1500 ft. It may be between 500 ft and 1500 ft.

The launch system may be configured to set the rotatable inertial mass member rotating (i.e. spinning) relative to the internal chassis. It may comprise a roller arranged for contact with an exterior chassis to rotate the exterior chassis relative to the aircraft. However, this is not essential and in some examples, rotation may instead be initiated by a motor internal to the emergency transmitter device.

In some examples, the emergency transmitter device comprises an emergency beacon configured to broadcast on an emergency frequency. In some examples, the emergency frequency is compatible with the COSPAS-SARSAT system. In some examples, the emergency transmitter device comprises a GPS receiver. The device may be configured to transmit location information (e.g. determined using the GPS receiver) using the radio transmitter.

The emergency transmitter device may be configured to communicate with a satellite communication systems, such as Starlink. In some examples, the emergency transmitter device is an Internet-of-Things (IoT) device. In some examples, the emergency transmitter device, once deployed, may capture live video of the aircraft and transmit the video using the radio transmitter. It may transmit video to IoT emergency services. The device may be configured to signal an emergency services unit to request a rescue operation.

The emergency transmitter device may comprise a floatation device. This may advantageously allow the emergency transmitter device to remain on the surface of the water in examples where the emergency transmitter device does not or cannot rendezvous with an emergency response unit. The floatation device may automatically deploy in the event of a loss of power to the emergency transmitter device.

Thus, it will be seen that, in at least some examples, by enabling a transition between a passive and an active flight state, the emergency transmitter device is able to capture higher quality and more accurate data to rescue services and improve outcomes for aircraft related emergencies.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain examples of the present disclosure will now be described, by way of example only, with reference to the accompanying drawings, in which.

DETAILED DESCRIPTION

Figure 1:
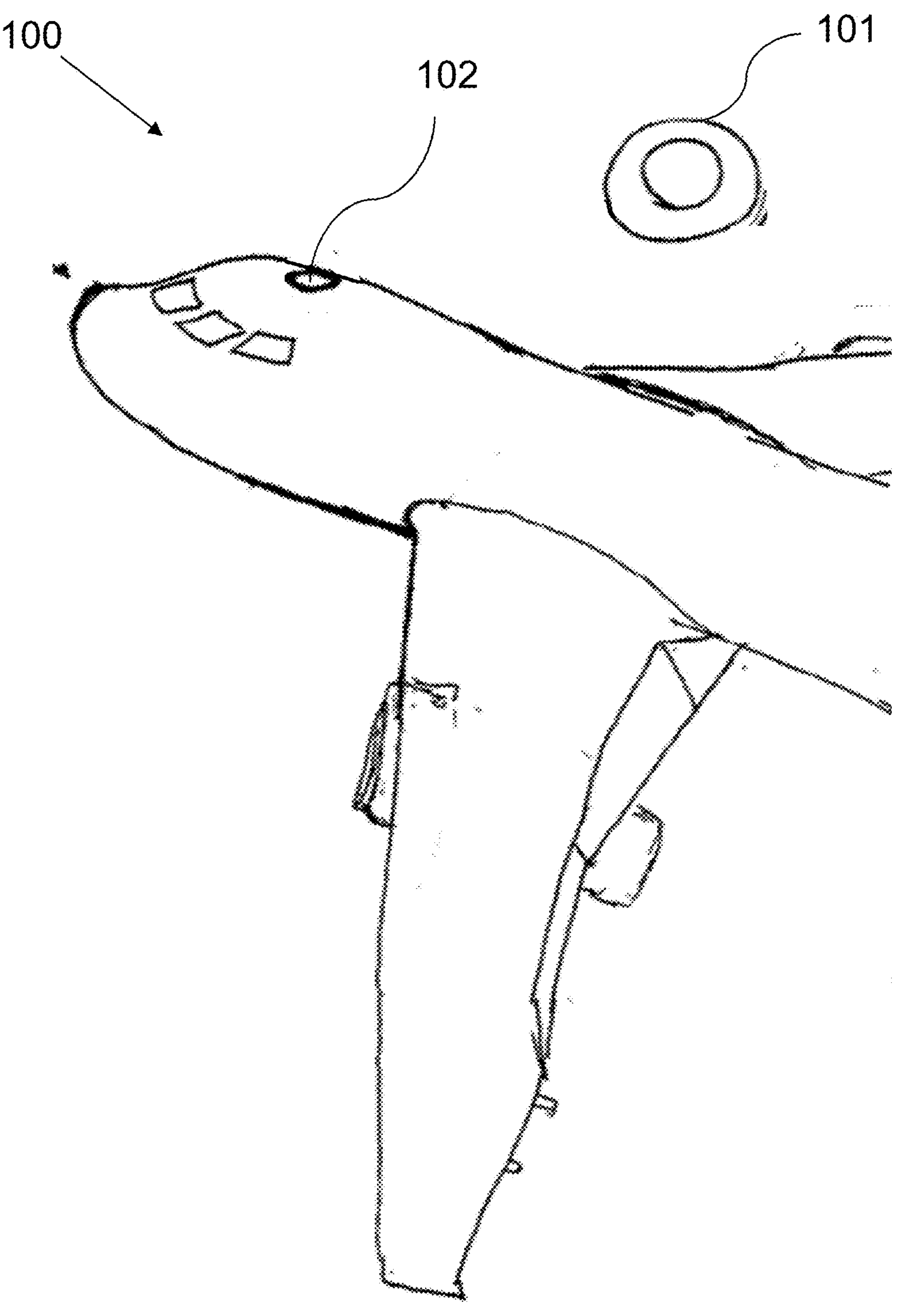
FIG. 1 shows a perspective view of an aircraft configured to house the deployable emergency transmitter device according to an example of the present disclosure.

FIG. 1 shows an aircraft 100 comprising an emergency-transmitter-device enclosure 102 and a deployable emergency transmitter device 101 that has been thrown from the aircraft 100. The device 101 may be deployed when the aircraft 100 is in an emergency situation, such as total engine power loss, or in a stall, or with a fire on-board, and can allow rescuers and investigators to locate the aircraft if it crashes, and provide them with important information about the crash, including video footage of the crash, potentially in real-time.

In this example, the emergency transmitter device enclosure 102 is arranged on or within an upper surface of the aircraft 100 and towards the nose end, e.g. above the cockpit. The enclosure 102 has dimensions sufficient to contain the emergency transmitter device 101. The emergency transmitter device enclosure 102 and/or the deployable emergency transmitter device 101 contained therein may be connected to the cockpit by a cable, rod or other manual actuation mechanism. Thus, in the event of an emergency, the pilot can manually deploy the emergency transmitter device 101, e.g. an alternative to electrical deployment in case of power failure. In other examples, the enclosure 102 and device 101 may be arranged towards the rear of the aircraft. A launch system is contained within the enclosure 102, as shown in more detail in FIG. 5.

While the device 101 is within the enclosure 102, it is configured ready for launch in a passive flight state. After the device 101 has been launched from the aircraft 100, it travels as a projectile in a passive flight state for a time, until the device 101 determines that relevant flight criteria are met, whereupon it transitions to an active (i.e. powered) flight state.

Figure 2A:
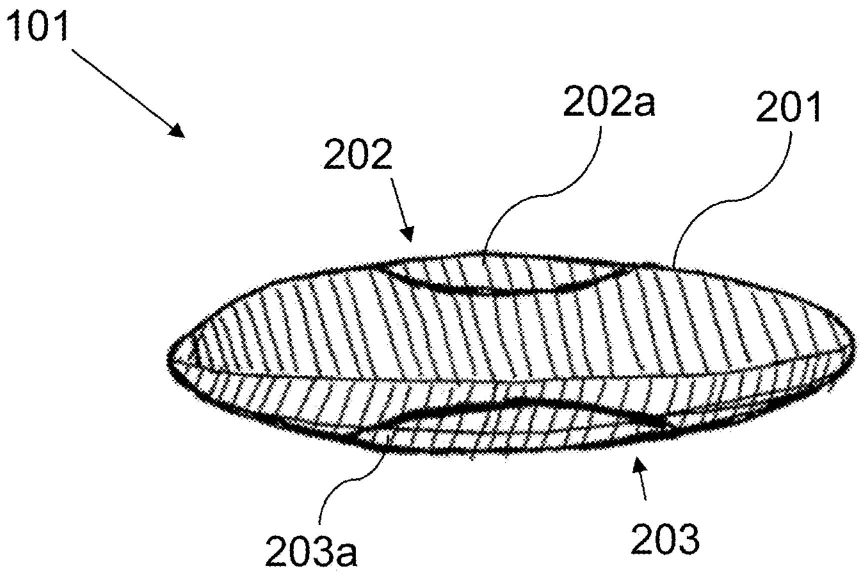
FIG. 2A shows a side view of the deployable emergency transmitter device in a passive flight state.

FIG. 2A shows a side view of the emergency transmitter device 101 when the device is in the passive flight state. The device 101 is oblate spheroidal in shape, with its minor axis providing a central axis for the device 101 that is intended to be substantially vertical (e.g. between zero and 45 degrees from vertical) when the device 101 is in flight. The outer surface of the device 101 is provided by an exterior chassis 201 that is rotatably mounted to an internal chassis 308 (i.e. a fuselage) within the device 101. The exterior chassis 201 has a circular upper aperture 202 that can be covered by an upper door 202*a*, and a circular lower aperture 203 that can be covered by a lower door 203*a*. Each door 202*a*, 202*a* may comprise a set of movable panel resembling diaphragm blades, and associated drive mechanism (e.g. an electric motor), allowing the device 101 to open and close the apertures 202, 203 as desired. Both the upper and lower apertures 202, 203 are closed in the passive flight state. The lower aperture 203 is greater in diameter than the upper aperture 202.

At launch, the exterior chassis 201 is set rotating (i.e. spinning) rapidly about the minor axis of the device 101, relative to the aircraft and to earth. The rotating mass of the exterior chassis 201 provides the device 101 with gyroscopic inertia that helps stabilise the device 101 in flight through gyroscopic stabilisation. This can reduce the risk of the device 101 colliding with the aircraft 100 or tumbling out of control after launch. The exterior chassis 201 is internally mounted on bearings to allow for smooth and continuous spinning relative to the internal chassis 308 of the device 101, with minimal energy losses due to frictional forces internal to the device 101.

Figure 2B:
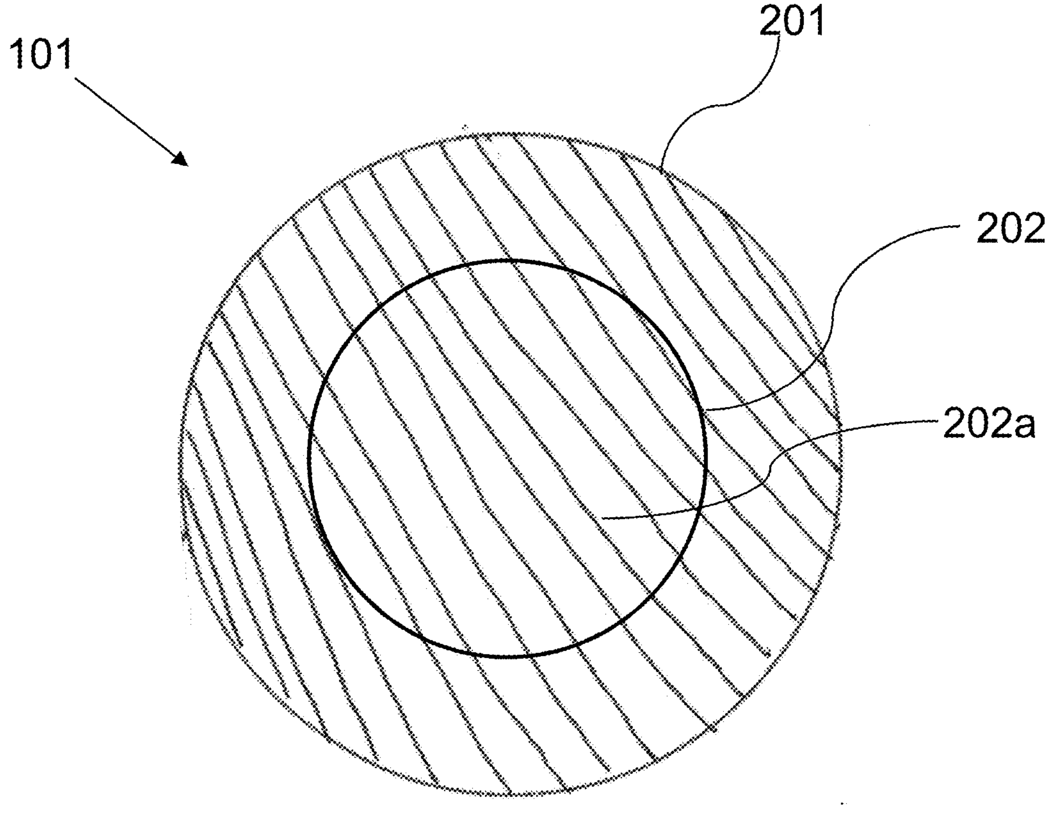
FIG. 2B shows a top view of the deployable emergency transmitter device in the passive flight state.

FIG. 2B shows a top down view of the emergency transmitter device 101 when the device is in the passive flight state. The centre of the circular upper aperture 202 substantially aligns with the central axis of the emergency transmitter device 101. The circular lower aperture 203 is also centrally aligned.

Figures 3A, 3B:
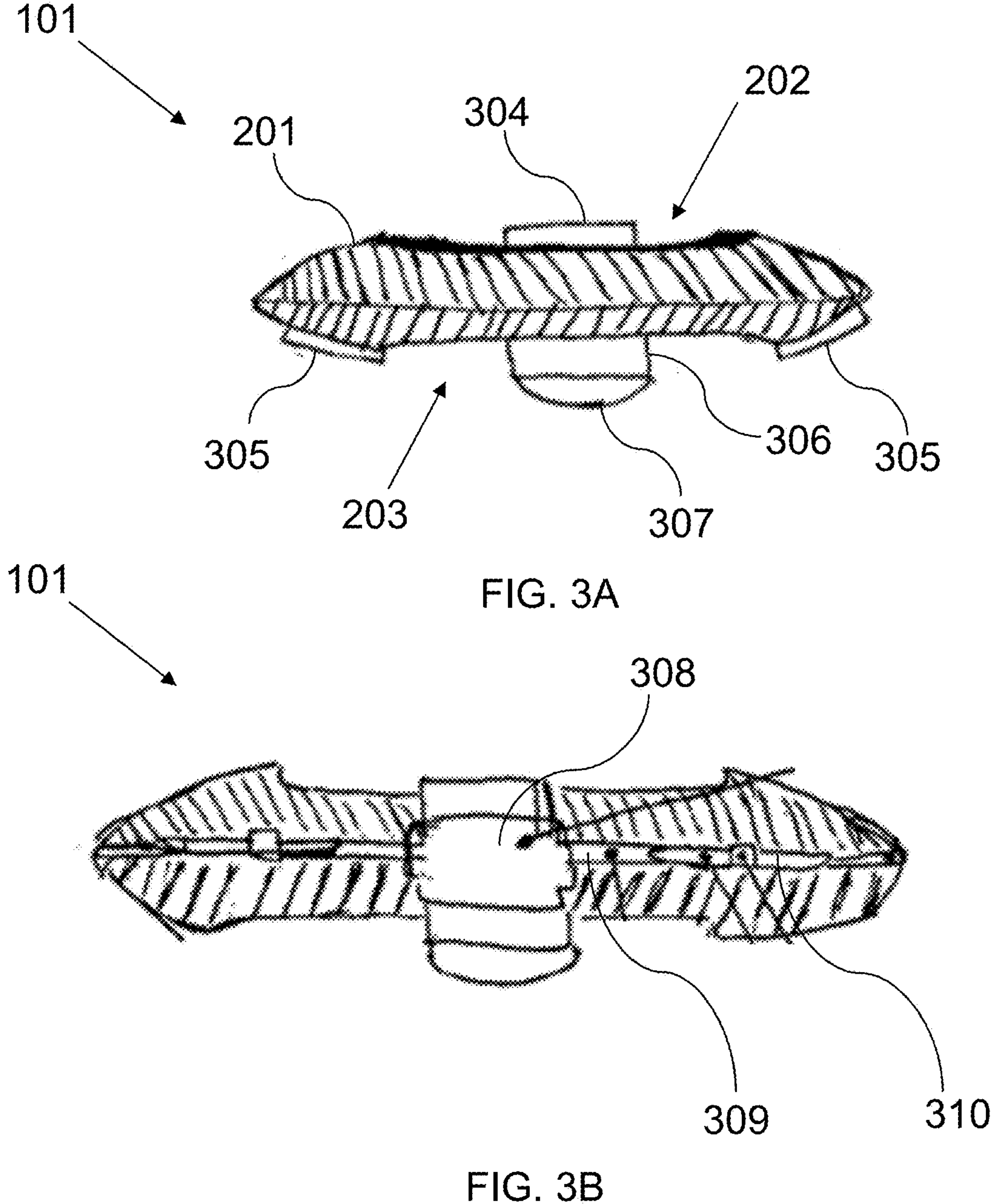
FIG. 3A shows a side view of the deployable emergency transmitter device in an active flight state.
FIG. 3B shows a cross sectional side view of the deployable emergency transmitter device.

FIG. 3A shows a side view of the emergency transmitter device 101 when the device is in an active flight state. The upper aperture 202 and the lower aperture 203 are now open. Although in this example, the upper 202 and lower 203 apertures are opened using a diaphragm mechanism, any of a variety of opening mechanisms may be used, and it is not necessary for both the top and bottom apertures to open using identical mechanisms.

A radio beacon 304 is arranged at the top of the device 101, and can broadcast an emergency radio signal when the device 101 is launched. The beacon 304 may be configured to use the COSPAS-SARSAT system, which requires the beacon 304 to broadcast a signal at 406 MHz for detection by satellites in the COSPAS-SARSAT network. In addition, the beacon 304 will transmit a low-power homing signal at 121.5 MHz, to allow rescue forces to home in on the beacon 304 as soon as they are in the vicinity.

Landing gear 305 is arranged on the bottom of the exterior chassis 201 to allow the device 101 to safely land without damaging the beacon 304 and other sensitive components. The landing gear 305 is stowed within the exterior chassis 201 during the initial passive flight state, but then extended to protrude from the exterior chassis 201 when the device 101 is in the active flight state.

In addition to the landing gear 305 and radio beacon 304, the device 101 is also equipped with a battery and control electronics 306 which control the operation of the device 101 in response to sensed operating conditions. In some examples, the control electronics may be connected to various sensors configured to detect air speed, pitch, yaw, roll, air pressure, among other factors. These sensors may be used by the control electronics 306 to decide when the device 101 should transition from the initial passive flight state to the subsequent active flight state. The control electronics 306 are housed within and/or mounted to the internal chassis 308 of the emergency transmitter device 101.

Mounted to the bottom of the emergency transmitter device 101 is a camera system 307. In some examples, the camera system 307 may include thermal imaging capabilities, to detect areas of elevated temperature; this may assist the device 101 in locating and/or tracking a trajectory of the aircraft 100, e.g. during or after a crash. The camera system 307 may be arranged to be extended past the boundary of the exterior chassis 201 when the device 101 is in the active flight state, e.g. by an electric motor, to provide the camera with greater visibility. The camera system 307 is designed to monitor the aircraft 100 from which the device 101 is deployed. This monitoring may include tracking (e.g. following) the aircraft 100 as it descends and/or crashes in an emergency situation, or to take aerial photography of a crash site of the aircraft 100. In order to aid the camera system 307 to do this, one or more gimbals and/or other motor systems may be included in the camera system 307 for stabilising and/or directing the camera as desired.

FIG. 3B shows a vertical cross section view of the emergency transmitter device 101 when the device is in the active flight state. In this view, it can be seen that, in addition to the components described above, the emergency transmitter device 101 also has a drive system for providing lift and thrust. In FIG. 3B, the drive system comprises four rotor arms 309 and four sets of rotor blades 310, which each have a respective electric motor connected to the control electronics 306 arranged within the internal chassis (fuselage) 308 of the emergency transmitter device 101. When the emergency transmitter device 101 is in the active flight state 300, the rotor blades 310 are driven to spin, and provide the lift necessary for the device 101 to hover, as well as directional thrust as required, and provide a steady platform for the camera system 307 to monitor the aircraft 100.

Figures 4A, 4B:
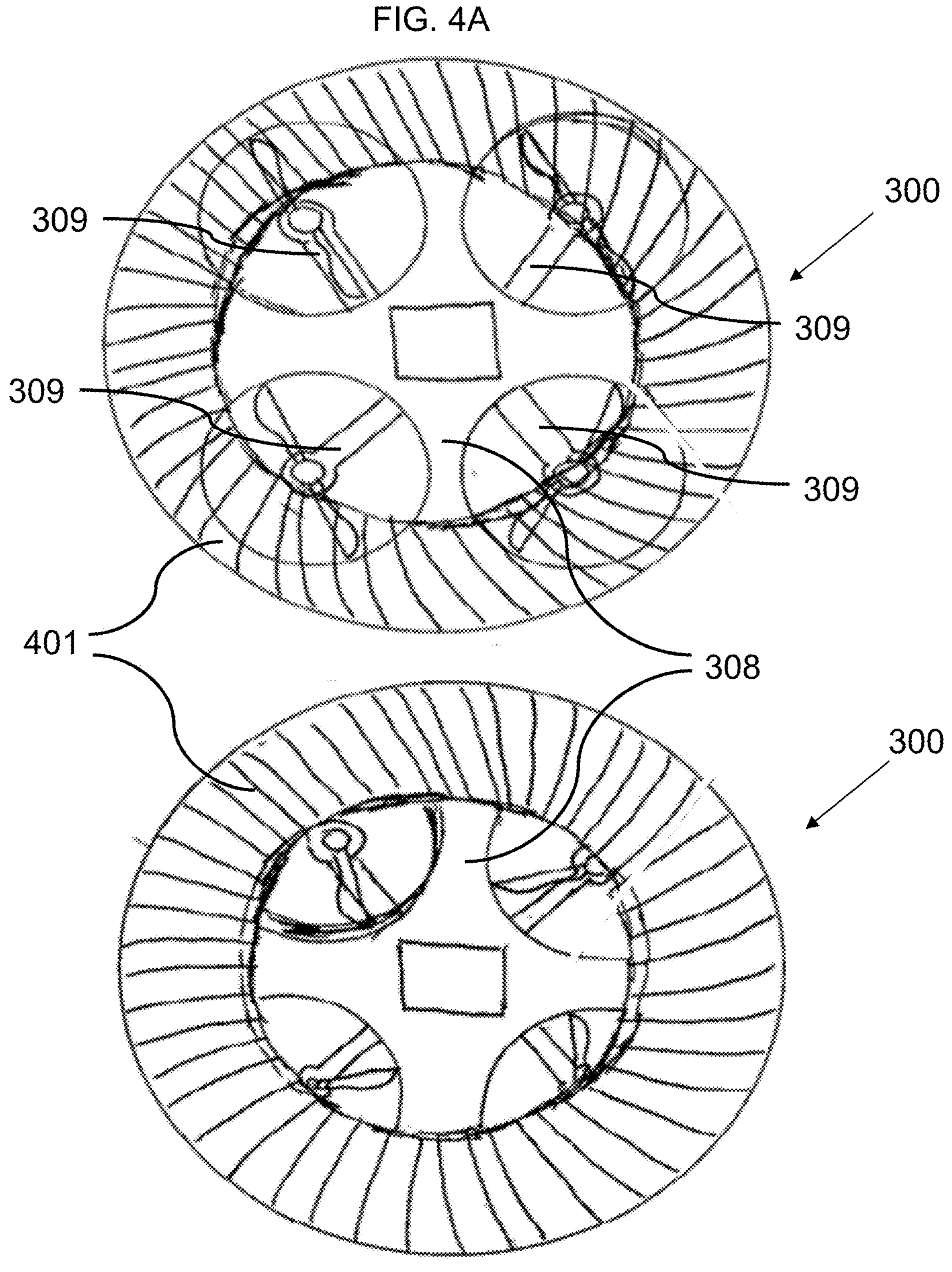
FIG. 4A shows a cross-sectional plan view of the deployable emergency transmitter device in the active flight state.
FIG. 4B shows a plan view of the deployable emergency transmitter device in the active flight state.

FIGS. 4A and 4B each depict the emergency transmitter device 101 in plan view while the device is in the active flight state. In FIG. 4A, the top side of the exterior chassis 401 is not shown so that the internal chassis 308 can be seen, above the lower side of the exterior chassis 401. The rotor blades 310 are arranged on their respective arms 309 with their rotor axles in a square formation, such that the emergency transmitter device 101 is configured like a quadcopter enclosed within the exterior chassis 401.

In FIG. 4B, it can be seen how the open upper aperture 202 and open lower aperture 203 allow for air to flow through the emergency transmitter device 101, typically from top to bottom, to allow for the rotor blades 310 to provide sufficient lift to keep the device 101 in the air as it completes its mission to monitor the aircraft 100.

Figure 5A:
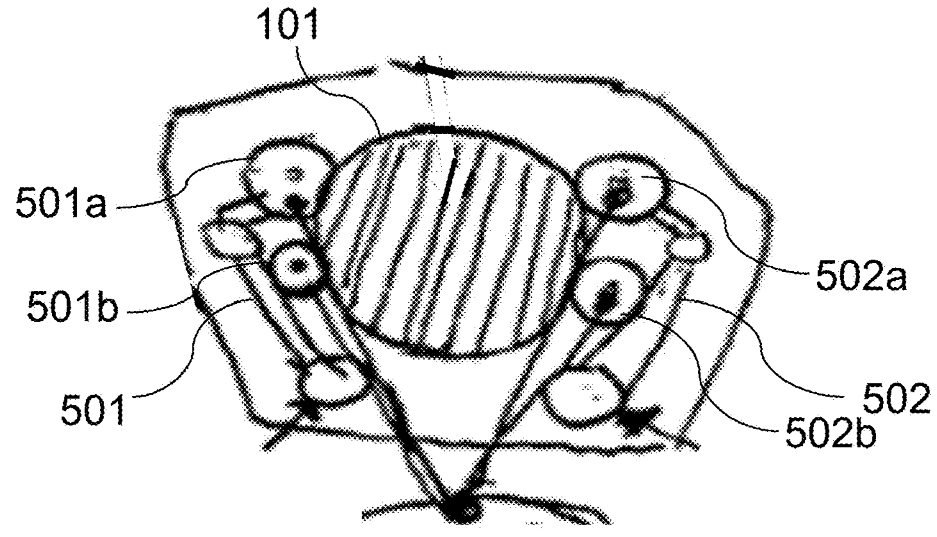
FIG. 5A schematically depicts the deployable emergency transmitter device within a launch system.
Figure 5B:
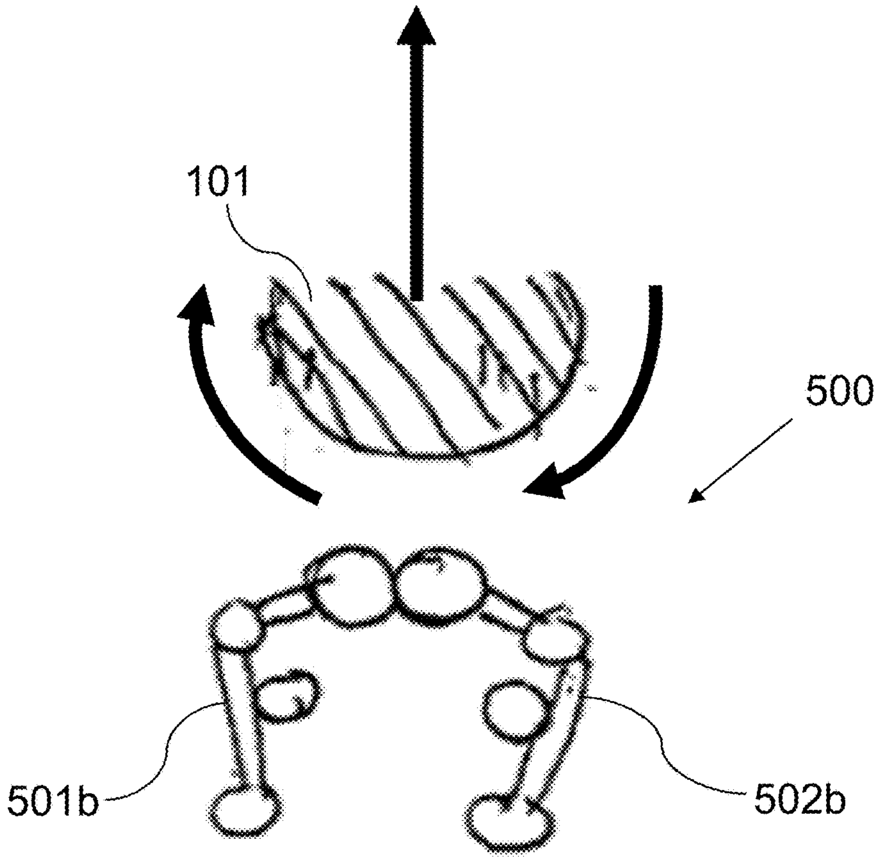
FIG. 5B schematically depicts the deployable emergency transmitter device being launched from the launch system.

FIGS. 5A and 5B shows how the emergency transmitter device 101 can, in some examples, be launched by a catapult launcher 500, contained with the enclosure 102 in the aircraft 100.

As shown in FIG. 5A, the catapult launcher 500 comprises left and right catapult arms 501, 502, arranged adjacent a left side and a right side, respectively, of the device 101 when it is installed in the launcher. The catapult arms 501, 502 comprise a set of symmetrical rollers 501*a,b*, 502*a,b* which contact the emergency transmitter device 101 when the device 101 is received between the arms.

When the emergency transmitter device 101 is stowed in the enclosure 102, the upper and lower apertures 202, 203 of the device are closed, and the exterior chassis 401 is stationary relative to the aircraft 100. In addition, the left catapult arm 501 and the right catapult arm 502 are spread apart by the device 101.

Then, when the emergency transmitter device 101 is required to be launched, a motor connected to the catapult arms 501, 502 causes the arms to pinch towards one another, such that the arms move from the spread-apart position to a closed-together position in which at least part of the arms 501, 502 are in contact with each other. The pinching of the arms causes the emergency transmitter device 101 to be launched forwards from the enclosure 102 in the initial passive flight state as shown by the straight arrow in FIG. 5B, with a rotational spin imparted onto the exterior chassis 201 by the rollers of the arms 501, 502, as shown by the clockwise arrows. One or more of the rollers may be actively driven by a motor to determine a direction and speed of rotation of the exterior chassis 401. This spin stabilises the flight of the emergency transmitter device 101 as it moves away from the aircraft 100 by taking advantage of gyroscopic stability provided by the spinning mass of the exterior chassis 401.

Figure 6:
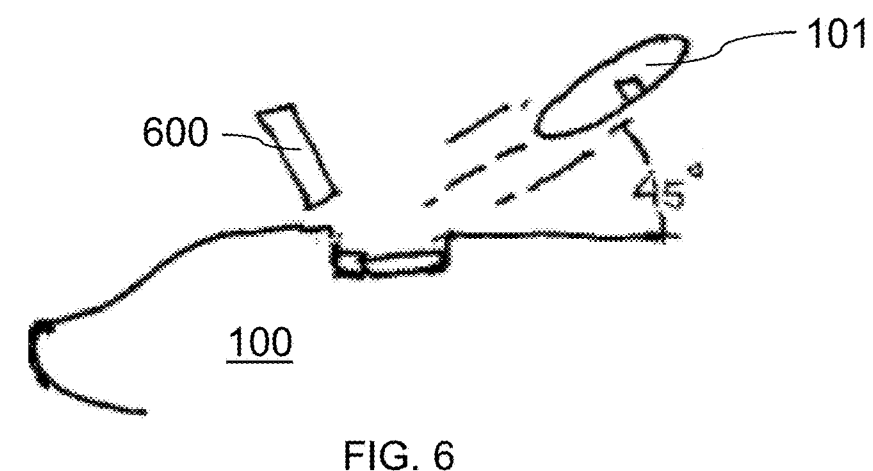
FIG. 6 is a schematic side view of the aircraft as the device is being launched.

FIG. 6 shows an example of how the device 101 may be launched upwards and away from the aircraft 100 at an angle, e.g. of approximately 45 degrees to the aircraft or to the ground, in order that the device 101 is rapidly thrown clear of the aircraft 100 and any turbulent air around the aircraft 100. Launching the device 101 at an angle may also aid in generating lift (e.g. through the flying-disc principle) in order to sustain passive flight until the powered flight state commences. The enclosure 102 may be covered by a cover 600 that is actively or passively opened or released upon deployment of the device 101, as shown in FIG. 6.

Launching of the emergency transmitter device 101 as described above may be triggered manually by a pilot or other person on board the aircraft 100. However, it is also possible that the catapult launcher 500 may be automatically activated when sensors on board the aircraft 100 detect that the aircraft 100 is in an emergency state, such as undergoing a rapid uncontrolled descent. For example, if the aircraft 100 were to rapidly lose altitude and fall below a predetermined altitude (e.g. 1500 ft) outside of a pre-planned flight program stored on the flight computer, then the catapult 500 could be automatically engaged to launch the emergency transmitter device 101.

Figure 7:
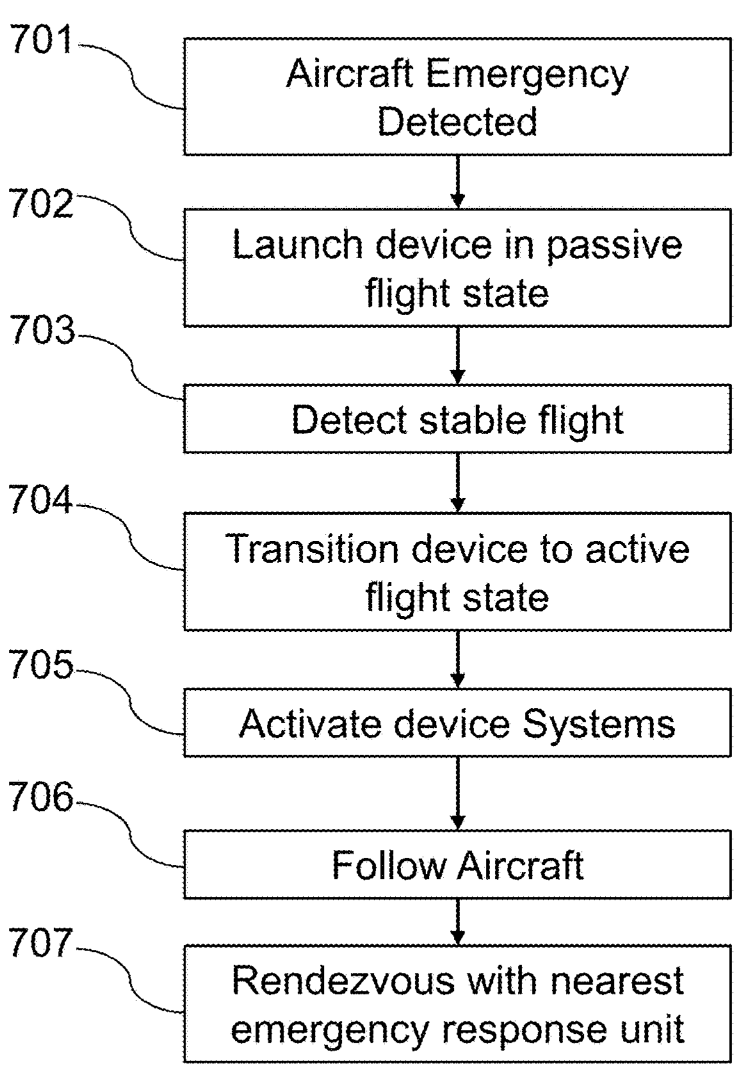
FIG. 7 is a flowchart depicting a method for operating the deployable emergency transmitter device according to an example of the present disclosure.

A method of operating the emergency transmitter device will now be described with reference to FIG. 7. At step 701, the sensors on board the aircraft 100 detect an emergency, such as loss of thrust from some or all of the engines, which may be significant enough to cause the aircraft to crash. The detection may be provided, for example, as an audio-visual alert to the pilot. At step 701, in response to the detection of an emergency, the emergency transmitter device 101 is launched from its enclosure 102. As described above, this may be done using the catapult launcher 500, though other systems may be used, so long as they impart spin on the device sufficient to stabilise it as it flies away from the aircraft 100.

Next, at step 702, when the emergency transmitter device 101 is launched from the aircraft 100, it is in the initial passive flight state, where both the upper aperture 202 and lower aperture 203 are closed. Subsequently at step 703, the on board systems of the device 101 detect when the device 101 has reached a stable flight state. This may be determined based on any one of more factors such as: time since launch; rate of spin of the exterior chassis 201; forward air speed; degree of rocking of the device 101; etc. It may be determined when a set of one or more criteria are met.

In response to the detection of a stable flight state, the emergency transmitter device 101 is configured to transition from the initial passive flight state to the active flight state, which occurs at step 704. As described above, this involves the opening of each of the upper and lower apertures, powering of the drive system to drive the rotor blades, the deployment of the camera system 307, landing gears 305, and the activation of the beacon 304. Activation of the systems of the device occurs at step 705.

Using the flight systems at step 706 which are now engaged in the active flight state, the emergency transmitter device 101 can follow the aircraft 100 as it descends, using the camera system to collect video or image data which will be useful for rescue teams to find the aircraft 100.

Finally, at step 707, when the emergency transmitter device 101 has established the final location of the aircraft, it may be configured to leave the site and rendezvous with the nearest emergency response unit. When it arrives, personnel at the response unit can use the data collected to pinpoint the area where the aircraft has landed, and send a rescue team to aid the survivors. The device 101 may also be configured to establish a real-time radio communication link, e.g. to a Starlink satellite, and to stream data such as location information and/or video data to a server and/or emergency response unit. The device 101 may also maintain a radio link to the aircraft 100, where possible, and receive data (e.g. GPS locations) from the aircraft 100, which it may store and/or relay to a remote server. The device 101 may also have its own on-board GPS receiver for generating position data for use by emergency responders and/or investigators.

It will be appreciated by those skilled in the art that the present disclosure has been illustrated by describing one or more specific examples thereof, but is not limited to these examples; many variations and modifications are possible, within the scope of the accompanying claims.

The invention claimed is:

1. A deployable emergency transmitter device configured to be launched from an aircraft in an initial passive flight state, the deployable emergency transmitter device comprising:

an internal chassis;

an inertial mass member, rotatable relative to the internal chassis, for stabilising flight during the initial passive flight state;

a powered drive system, mounted to the internal chassis and configured for providing lift while the deployable emergency transmitter device is in an active flight state; and a radio transmitter configured for transmitting an emergency signal after being launched from the aircraft;

wherein the deployable emergency transmitter device is configured to transition from the initial passive flight state to the active flight state, after being launched from the aircraft.

2. The deployable emergency transmitter device of claim 1, wherein the drive system comprises one or more electric motors.

3. The deployable emergency transmitter device of claim 1, further comprising a battery and one or more solar cells, for powering the deployable emergency transmitter device.

4. The deployable emergency transmitter device of claim 1, wherein the deployable emergency transmitter device is configured to determine when the device has reached a stable flight condition after being launched from the aircraft, and to transition from the initial passive flight state to the active flight state in response thereto.

5. The deployable emergency transmitter device of claim 1, further comprising:

one or more sensors for detecting when the deployable emergency transmitter device has reached a stable flight condition.

6. The deployable emergency transmitter device of claim 5, wherein the one or more sensors includes: an accelerometer; or a gyroscope; or a wind speed sensor;

a GPS location system; or a pressure sensor.

7. The deployable emergency transmitter device of claim 1, further comprising:

a control system configured to determine when one or more conditions are met for transitioning to the active flight state, wherein the one or more conditions includes: a speed condition; a location condition; an altitude condition; an orientation condition; an inclination condition; a pitch condition; an acceleration condition; a time condition; or a measure of stability.

8. The deployable emergency transmitter device of claim 1, wherein the deployable emergency transmitter device is configured to monitor the aircraft using one or more onboard sensors or a radio link with the aircraft after the emergency transmitter device transitions to the active flight state.

9. The deployable emergency transmitter device of claim 1, wherein the deployable emergency transmitter device is oblate spheroidal in shape and wherein the rotatable inertial mass member may be arranged for rotation about a central axis of the device.

10. The deployable emergency transmitter device of claim 1, wherein the drive system is configured to enable the device to hover.

11. The deployable emergency transmitter device of claim 1, wherein:

the radio transmitter is an emergency beacon configured to broadcast on an emergency frequency, or the device is configured to transmit location information using the radio transmitter.

12. A method for operating the deployable emergency transmitter device according to claim 1, the method comprising:

launching the deployable emergency transmitter device from an aircraft in an initial passive flight state wherein the inertial mass member is rotating relative to the internal chassis;

activating the radio transmitter to transmit an emergency signal; and transitioning the deployable emergency transmitter device from the initial passive flight state to the active flight state.

13. An emergency transmitter system comprising:

the deployable emergency transmitter device according to claim 1; and a launch system for launching the deployable emergency transmitter device from the aircraft, wherein the launch system is configured to:

initiate inertial stabilisation of the deployable emergency transmitter device by setting the rotatable inertial mass member rotating relative to the internal chassis; and launch the deployable emergency transmitter device from the aircraft.

14. The emergency transmitter system of claim 13, wherein the launch system is configured to launch the deployable emergency transmitter device in response to detecting one or more conditions being met that are indicative of an emergency.

15. The emergency transmitter system of claim 13, wherein the launch system is configured for manual launch of the deployable emergency transmitter device by a pilot or crew member of the aircraft.

* * * * *